(12) United States Patent
Muhanna et al.

(10) Patent No.: US 10,219,152 B2
(45) Date of Patent: Feb. 26, 2019

(54) SECURITY ARCHITECTURE AND SOLUTION FOR HANDLING INTERNET OF THINGS DEVICES IN A FIFTH GENERATION SYSTEM

(71) Applicant: Futurewei Technologies, Inc., Plano, TX (US)

(72) Inventors: Ahmad Shawky Muhanna, Richardson, TX (US); Mazin Al-Shalash, Frisco, TX (US); Jiangsheng Wang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 150 days.

(21) Appl. No.: 15/263,588

(22) Filed: Sep. 13, 2016

(65) Prior Publication Data

US 2017/0078875 A1 Mar. 16, 2017

Related U.S. Application Data

(60) Provisional application No. 62/218,371, filed on Sep. 14, 2015.

(51) Int. Cl.
*H04L 29/06* (2006.01)
*H04W 12/04* (2009.01)
*H04L 9/08* (2006.01)

(52) U.S. Cl.
CPC .......... *H04W 12/04* (2013.01); *H04L 9/0822* (2013.01); *H04L 9/0833* (2013.01); *H04L 63/065* (2013.01)

(58) Field of Classification Search
None
See application file for complete search history.

(56) References Cited

U.S. PATENT DOCUMENTS

| 8,495,377 | B2* | 7/2013 | Haddad | H04L 63/0823 380/278 |
|---|---|---|---|---|
| 2005/0094805 | A1* | 5/2005 | Kitani | H04L 9/0662 380/28 |
| 2009/0323972 | A1* | 12/2009 | Kohno | G06F 21/6245 380/284 |

(Continued)

OTHER PUBLICATIONS

"3rd Generation Partnership Project; Technical Specification Group Services and System Aspects; 3GPP System Architecture Evolution (SAE); Security architecture (Release 12)," 3GPP Organization Partners (ARIB, ATIS, CCSA, ETSI, TTA, TIC), 3GPP TS 33.401 v12.5.1, Technical Specification, Oct. 2012, 121 pages.

(Continued)

*Primary Examiner* — Malcolm Cribbs
(74) *Attorney, Agent, or Firm* — Conley Rose, P.C.

(57) ABSTRACT

A method of establishing a group trust relationship in an Internet of Things (IoT) system using a first IoT device within a group of IoT devices is provided. The method includes generating, by the first IoT device, a first set of keys corresponding to the first IoT device, deriving, by the first IoT device, a group set of keys corresponding the group of IoT devices, and discarding the first set of keys and storing the group set of keys after the first IoT device transmits data toward a base station and goes idle, wherein the group set of keys is used by each IoT device within the group of IoT devices for subsequent transmissions of data to the base station.

20 Claims, 9 Drawing Sheets

(56) References Cited

U.S. PATENT DOCUMENTS

| | | | | |
|---|---|---|---|---|
| 2010/0002883 A1* | 1/2010 | Sammour | ........... | H04L 63/1416 380/272 |
| 2013/0343280 A1* | 12/2013 | Lee | ......... | H04L 63/20 370/328 |
| 2015/0237071 A1* | 8/2015 | Maher | ..................... | H04L 63/20 726/1 |
| 2016/0269374 A1* | 9/2016 | Smith | ................... | H04L 63/065 |
| 2016/0365975 A1* | 12/2016 | Smith | ................... | H04L 9/0822 |

OTHER PUBLICATIONS

Lai, C., et al., "SE-AKA: A Secure and Efficient Group Authentication and Key Agreement Protocol for LTE Networks," 2013 Elsevier B.V., Computer Networks 57, Journal Homepage: www.elsevier.com/locate/comnet, 2013, pp. 3492-3510.

* cited by examiner

SECURITY ARCHITECTURE AND SOLUTION FOR HANDLING INTERNET OF THINGS DEVICES IN A FIFTH GENERATION SYSTEM

CROSS-REFERENCE TO RELATED APPLICATIONS

The present application claims priority to U.S. Provisional Patent Application 62/218,371, filed Sep. 14, 2015 by Ahmad Shawky Muhanna, Mazin Al-Shalash and Jiangsheng Wang, and entitled "Security Architecture and Solution for Handling Internet of Things Devices in a Fifth Generation System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The growth of the Internet of Things (IoT) is expected to result in a drastic increase in the amount of data available to describe the world. Some examples of data generated by IoT devices may include sensor data collected from IoT devices, videos and/or images collected from video monitoring systems, and other monitoring and/or performance data collected from data centers (DCs), mobile networks, and/or mobile terminals. As the amount of data increases, users will seek to preserve and/or protect the data. Thus, a security architecture employed to access such data should allow a mechanism which securely accesses and/or "wakes up" a device at any time for security measures.

Third generation partnership project (3GPP) technical specification (TS) 33.401 V 12.5.1 published on October 2012, which is incorporated by reference, provides further details regarding message flows/sequences utilized by the various procedures described herein. Additionally, "SE-AKA: A secure and efficient group authentication and key agreement protocol for LTE networks" by Chengzhe Lai, et al., which discusses group authentication in long term evolution (LTE) networks and locally authenticating a group of machine type communication (MTC) via a Mobility Management Entity (MME) to avoid round trips for each MTC device between the MME and a Home Subscriber Server (HSS), is incorporated by reference.

The changes throughout IoT are anticipated to be one of the fifth generation (5G) technologies that require an architectural security solution. An IoT MTC device usually has the following criteria: (1) the device is fixed and does not need to support mobility (i.e., such a device more than likely accesses a cellular network over a same point of access over time); (2) the amount of data communication by the device is very small; (3) the frequency of communication by the device to the network is limited (for example once or twice a month); (4) device functionality may be very limited and thus the operating system is limited in scope and functionality to reduce the exposure to attack at the device itself; (5) the device has low power and operates with a very small power supply that needs to last for the lifetime of the IoT device; and (6) the device accesses the network over differing deployment models, for example, direct access over the cellular access network or access through a local IoT gateway.

SUMMARY

To ensure secure communications between an IoT device (e.g., sensor) and an access point (e.g., evolved nodeB (eNB), etc.), security keys are established. Each time that the IoT device "wakes up" to transmit data to the access point, a new set of security keys is generated. Once the IoT device is finished transmitting data to the access point, the IoT device and the access point discard their security keys. As such, each time the IoT device wakes up and intends to transmit data, a new set of security keys needs to be established. This process of establishing a new set of security keys each time the IoT device wakes up consumes a large number of resources on the IoT device and may undesirably deplete the battery of the IoT device. The process of establishing a new set of security keys each time the IoT device wakes up also consumes a large number of resources on the access point, especially if the access point is serving a large number of the IoT devices. To resolve these and other problems, and as will be more fully explained below, disclosed embodiments comprise a trust model where IoT devices are organized into groups and security keys are maintained instead of being discarded after each transmission. Because the security keys are maintained, an "always on" connection exists between the IoT devices in the group and the access point. Because the connection is "always on," each time an IoT device "wakes up" the IoT device is able to transmit without new security keys having to be established. As such, the load/overhead on the access point is reduced.

In an embodiment, the disclosure includes a method of establishing a group trust relationship in an Internet of Things (IoT) system using a first IoT device within a group of IoT devices. The method includes generating, by the first IoT device, a first set of keys corresponding to the first IoT device, deriving, by the first IoT device, a group set of keys corresponding the group of IoT devices, and discarding the first set of keys and storing the group set of keys after the first IoT device transmits data toward a base station and goes idle, wherein the group set of keys is used by each IoT device within the group of IoT devices for subsequent transmissions of data to the base station.

In an embodiment, the group set of keys includes at least one of a group base station key, a group encryption key, and a group integrity key corresponding to the group of IoT devices. In an embodiment, the group set of keys is based on a group access security mobility entity key derived by the first IoT device. In an embodiment, the group access security mobility entity key is based on a group cyphering key and a group integrity protection key derived by the first IoT device. In an embodiment, the group cyphering key and the group integrity protection key are based on a group secret key obtained from the first IoT device. In an embodiment, a group key used to generate the group set of keys is preconfigured on a card of the first IoT device. In an embodiment, a group key used to generate the group set of keys is received by the first IoT device over a per-device secure channel. In an embodiment, the first IoT device serves as an IoT gateway for each of the other IoT devices in the group of IoT devices.

In an embodiment, the disclosure includes method of establishing a group trust relationship in an Internet of Things (IoT) system using a base controller. The method includes receiving, from a management entity, a first set of keys corresponding to a first IoT device within a group of IoT devices, receiving, from the management entity, a group key corresponding the group of IoT devices, generating a group set of keys corresponding the group key, discarding the first set of keys and storing the group set of keys after the first IoT device transmits data and goes idle, and receiving, from a second IoT device within the IoT group, a subsequent transmission of data using the group set of keys.

In an embodiment, the group set of keys includes at least one of a group base station key, a group encryption key, and a group integrity key corresponding to the group of IoT devices. In an embodiment, the group set of keys is based on a group access security mobility entity key derived by the management entity. In an embodiment, the group access security mobility entity key is based on a group cyphering key and a group integrity protection key derived by the management entity, and wherein the group cyphering key and the group integrity protection key are based on a group secret key obtained from a subscriber identification module card of the management entity. In an embodiment, the first IoT device and each other IoT device in the group of IoT devices share the group secret key. In an embodiment, the first IoT device and each other IoT device in the group of IoT devices share the group cyphering key and the group integrity protection key. In an embodiment, the method further comprises sending, to at least one of the IoT devices in the group of IoT devices, a challenge requesting the at least of the IoT devices to reestablish the group trust relationship.

In an embodiment, the disclosure includes a management entity configured to establish a group trust relationship in an Internet of Things (IoT) system. The management entity includes a memory and a processor operably coupled to the memory. The processor is configured to obtain, from a subscriber identification module card, a secret key corresponding to a first IoT device from a group of IoT devices, derive a cyphering key and an integrity protection key based on the secret key, derive an access security mobility entity key based on the cyphering key and an integrity protection key, derive a first set of keys corresponding to the first IoT device based on the access security mobility entity key, and encrypt and transmit a group secret key to the first device over a secure communications channel, wherein the group secret key permits the first IoT device to generate a group set of keys for subsequent transmissions of data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, and may be modified within the scope of the appended claims along with their full scope of equivalents.

Disclosed herein are a security architecture and a second security architecture that address IoT device deployment options where an IoT device accesses a network directly over the cellular access network and an IoT device accesses the network through a local IoT gateway. The disclosed embodiments comprise a trust model where a group trust relationship is established and shared between a group of IoT devices and a serving cellular network access point (e.g., a base station, central controller, evolved node B (eNB), etc.). In various embodiments disclosed in this application, the first or the second security architecture may include an IoT device that is a member of a group of IoT devices which have direct access over a cellular network. The group of IoT devices may have similar functionalities or may belong to a common operator and/or service provider. In other embodiments, an IoT device in the first or the second security architecture deployment option may not have direct access over the cellular access network but rather may communicate over a local network and employ a local IoT gateway to communicate over the cellular network in order to reach an assigned service provider. In an embodiment, a group of IoT devices is able to share an "always on" connection over the air interface with a access point of the serving cellular network. The IoT device transmits data over the shared "always on" connection by employing a group trust relationship. In various embodiments, the local IoT gateway may be an IoT device specified in security architecture which also provides connectivity to other IoT devices, a security architecture and/or a second security architecture. In various embodiments, a security architecture for IoT devices of the security architecture is also applicable to the local IoT gateway. In one embodiment, the security architecture secures the communication over the air interface between the IoT device and the serving cellular network access point, thus providing a secure mechanism that is common to a group of IoT devices by allowing the group of devices to use a group trust relationship with an access node or an access point of the serving cellular network. In another embodiment, the security architecture employs a serving cellular network access point to provide a communication channel while the traffic from the IoT device(s) is protected with end-to-end security between the IoT device and an assigned IoT application server or network IoT gateway, thus providing a secure solution to address IoT devices that do not support cellular access and that access the network via a local IoT gateway.

The disclosed security architecture creates a group trust relationship that creates a secure tunnel over the air for a group of IoT devices. The security parameters for this secure tunnel may be made available to the IoT group of devices, thus reducing the load/overhead on a serving cellular network access point.

Figure 1:
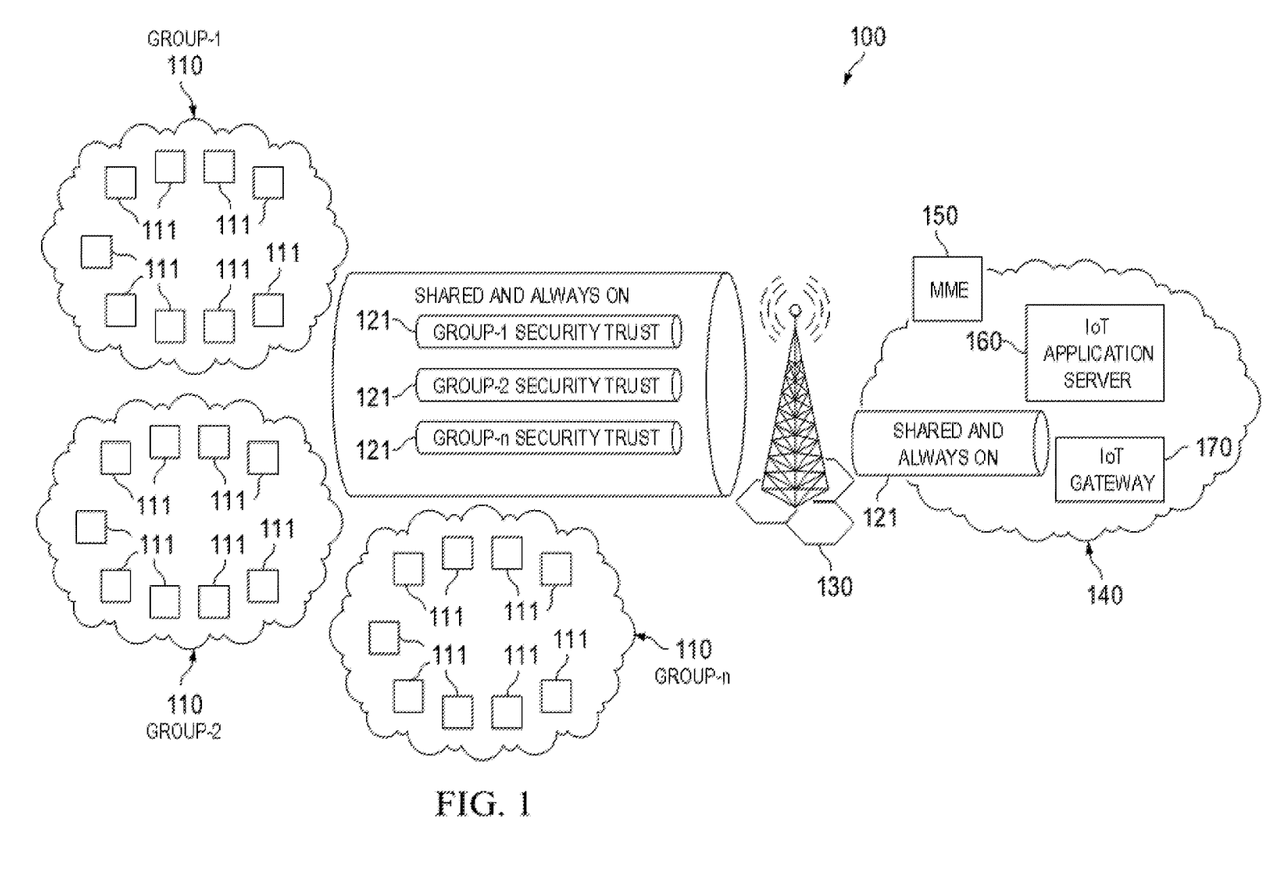
FIG. 1 is a schematic diagram of a security architecture according to an embodiment of the disclosure.

FIG. 1 is a schematic diagram of an embodiment of a security architecture 100. The security architecture 100 includes groups of IoT devices 110, an access point 130, and a serving network 140. The groups of IoT devices 110 include individual IoT devices 111. In an embodiment, the IoT devices 111 are sensors, cameras, actuators, and so on. The IoT devices 111 are organized into different groups, which are designated as "Group-1," "Group-2," and "Group-n" in FIG. 1. In an embodiment, the IoT devices 111 are grouped based on similarities in their functionalities. In an embodiment, the IoT devices 111 are grouped together because they share a common operator and/or service provider.

In an embodiment, the access point 130 is a base station, a controller, a node B, an evolved node B (eNB), or other similar device. In an embodiment, the access point 130 is an air interface that facilitates communication between the IoT devices 111 and the serving network 140. In an embodiment, the security architecture 100 includes more than one access point 130. For example, the security architecture 100 may include a first access point 130 servicing the IoT devices 111 in Group-1 and a second access point (not shown) servicing the IoT devices 111 in Group-2.

The serving network 140 includes an MME 150, an IoT application server 160, and an IoT gateway 170 in some embodiments. The MME 150 generally functions as a control node for accessing the access point 130. The access point 130 transmits data received from the IoT devices 111 to the IoT gateway 140 in the serving cellular network 140. The IoT gateway then routes the data to corresponding IoT application servers 160.

Each of the IoT devices 111 is configured to communicate with the access point 130 using a private trust relationship. In other words, each separate IoT device 111 is able to use its own identifying information to communicate with the access point 130. This type of communication between devices will be described more fully below. Each of IoT devices 111 is also able to use a shared and "always on" over-the-air connection 121 with the access point 130 of the serving cellular network 140. This shared and always on connection 121 maybe referred to as a group trust relationship. The group trust relationships 121 are designated as "Group-1 security trust," "Group-2 security trust," and "Group-n security trust" in FIG. 1. The Group-1 security trust corresponds to the group of IoT devices labeled Group-1, the Group-2 security trust corresponds to the group of IoT devices labeled Group-2, and the Group-3 security trust corresponds to the group of IoT devices labeled Group-3. As such, each group of IoT devices 110 has its own separate group connection with the access point 130.

In an embodiment, one of the IoT devices 111 from a first group (e.g., Group-1) is capable of using the group trust relationship 121 of more than one group (e.g., Group-1 and Group-2) to transmit data to the access point 130. In an embodiment, one of the IoT devices 111 from the group (e.g., Group-1) is able to function as a local IoT gateway (not shown) for one or more of the remaining IoT devices 111 in that particular group.

As shown, the access point 130 also has a shared and "always on" connection 121 with the serving cellular network 140. The manner in which the shared and always on connections are established and utilized will be more fully described below. Using the group trust relationships 121, the IoT device 111 of a group of IoT devices is able to send data as soon as it "wakes up." In other words, the tunnel between the IoT device 111 and the access point 130 need not be re-established because that tunnel is maintained. In other words, the tunnel is kept up or active even after an IoT device transmits its data and goes to sleep. In an embodiment, the data is sent from the IoT device 111 to the access point 130 through the group trust relationship 121. The access point 130 transmits the data to the IoT gateway 170 in the serving cellular network 140. From there, the IoT gateway 170 handles the routing of the data to corresponding IoT application servers 160.

Figure 2:
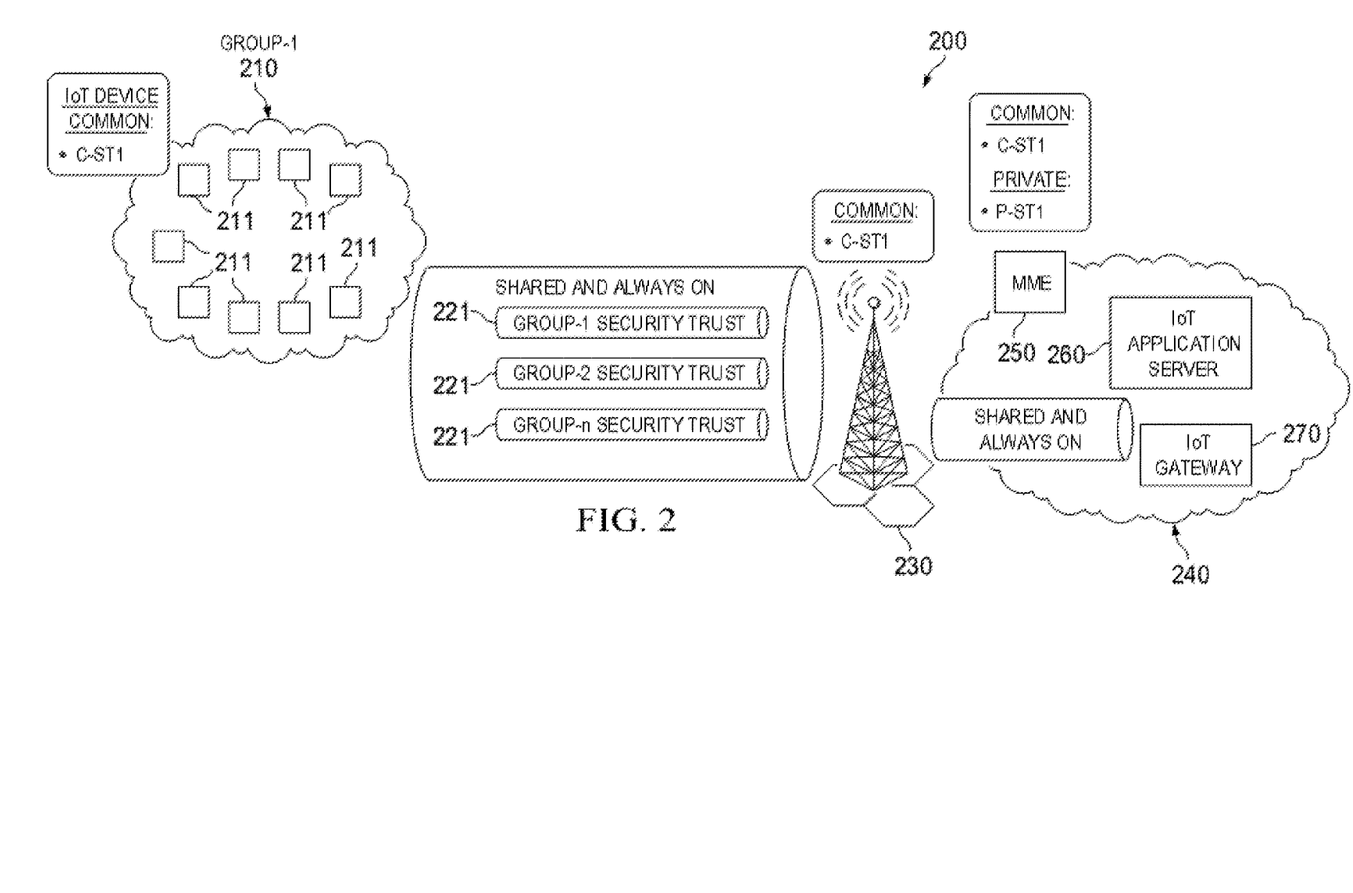
FIG. 2 is a schematic diagram of the security architecture between a group of IoT devices and a serving cellular network according to an embodiment of the disclosure.

FIG. 2 is a schematic diagram of an embodiment of a security architecture 200. The security architecture 200 of FIG. 2 is similar to the security architecture 100 of FIG. 1. As shown, the security architecture 200 includes at least one group of IoT devices 210, an access point 230, and a serving cellular network 240. The group of IoT devices 210, access point 230, and serving cellular network 240 of FIG. 2 are similar to the group of IoT devices 110, access point 130, and serving cellular network 140, respectively, of FIG. 1.

The group of IoT devices 210 in FIG. 2 is designated as "Group 1" and includes individual IoT devices 211. In an embodiment, the IoT devices 211 are grouped based on similarities in their functionalities. In an embodiment, the IoT devices 211 are grouped together because they share a common operator and/or a common service provider.

The IoT devices 211 in the group of IoT devices 210 have a group trust relationship 221 with an access point 230 of the serving cellular network 240. The group trust relationship 221 corresponding to the group of IoT devices 210 is designated as "Group-1 security trust." The IoT devices 211 in the group of IoT devices 210 employ the group trust relationship 221 when communicating with the serving cellular network 240 via the access point 230. Other groups of IoT devices (not shown) would utilize the group trust relationships labeled "Group-2 security trust" and "Group-n security trust" in FIG. 2 for communications.

In an embodiment, each IoT device 211 of the group of IoT devices 210 in FIG. 2 has a group trust relationship with the access point 230 of the serving cellular network 240, which is designated as "C-ST1" in FIG. 2. In an embodiment, each IoT device 211 also has at least one private trust relationship with the access point 230 of the serving cellular network 240, where the private trust relationship details are designated as "P-ST1" in FIG. 2. The private trust relationship is unique to the corresponding IoT device 211 and therefore the private trust relationship is used to identify an authenticity of the IoT device 211. In an embodiment, each IoT device 211 stores the details of the group trust relationship. As such, each of IoT devices 211 is able to use a shared and "always on" over-the-air connection 221 with the access point 230 of the serving cellular network 240. In an embodiment, the access point 230 of the serving cellular network 240 stores the details of group trust relationships that correspond to each group of IoT devices 210.

In an embodiment, the serving cellular network 240 comprises an MME 250, an IoT application server 260, and an IoT gateway 270. The MME 250, the IoT application server 260, and the IoT gateway 270 of FIG. 2 are similar to the MME 150, the IoT application server 160, and the IoT gateway 170 of FIG. 1. The MME 250 of the serving cellular network 240 is configured to store the private trust relationship details corresponding to each IoT device 211 and the group trust relationship details corresponding to each group of IoT devices 210. In some circumstances, the group trust relationships 221 are no longer current and need to be updated for a group of IoT devices 210. In such situations, the serving cellular network 240 permits the IoT devices 211 to transmit data according to a previous group security trust relationship, but takes steps to update the group trust relationships 221 so that all group trust relationships 221 are updated and current.

In an embodiment, the IoT device 211 in the security architecture 200 is configured to use the respective group trust relationship by default when transmitting data to the serving cellular network 240. If, for example, there is a report of a security breach, the MME 250 and/or the access point 230 are able to challenge the IoT device 211. When challenged, the IoT device 211 uses a private trust relationship instead of the group trust relationship. The private trust relationship is used until the security breach is investigated or resolved or until a group trust relationship is re-established. In other words, the serving cellular network 240 may demand that the group trust relationships and/or the private trust relationship be updated once the IoT device 211 verifies the private security trust relationship. The reported breach situation is merely an example and not intended to limit this disclosure.

In an embodiment, association of the IoT device 211 to a particular group of IoT devices 210 is performed dynamically or statically, and the association is performed when the IoT device 211 initially transmits data to the serving cellular network 240. For example, a node, such as the HSS or an IoT group management server, may manage the IoT device 211 membership to the group(s) of IoT devices 210.

In an embodiment, data is sent from the IoT device 211 to the access point 230 using the group trust relationships 221. The access point 230 transmits the data to the IoT gateway 270 in the serving cellular network 240. From there, the IoT gateway 270 handles the routing of the data to corresponding IoT application servers 260. In doing so, the IoT device 211 stores its group trust relationship details, and the access point 230 stores the group trust relationship details relative to the IoT device 211. The MME 250 is configured to store the private trust relationship details and group trust relationship details relative to the IoT device 211 and the group of IoT devices 210. The IoT device 211 can directly use the group trust relationship stored at the IoT device 211 when the IoT device "wakes-up" and is ready to transmit data in a next instance.

Figure 3:
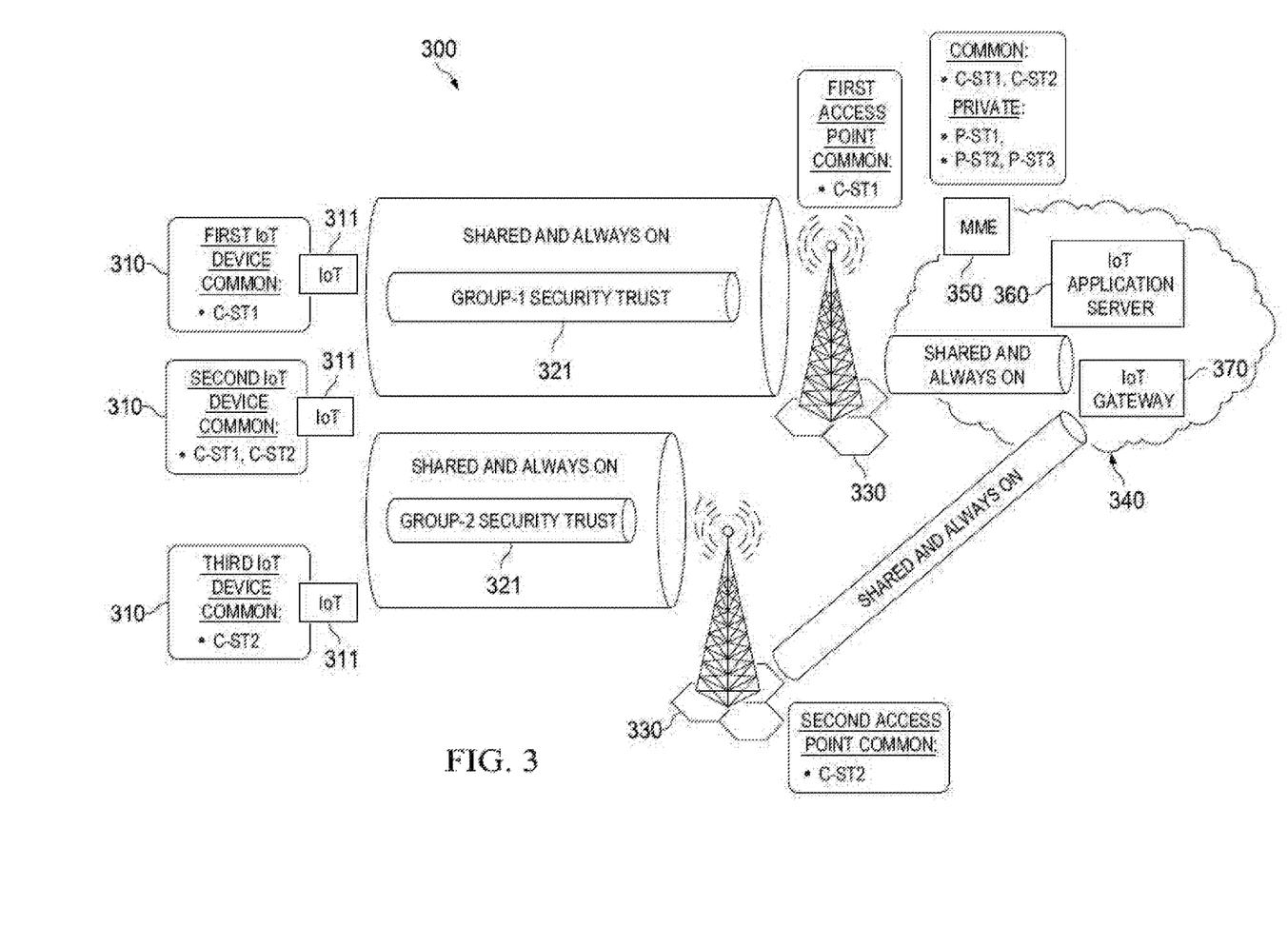
FIG. 3 is a schematic diagram of the security architecture between IoT devices belonging to different groups of IoT devices and a serving cellular network according to another embodiment of the disclosure.

FIG. 3 is a schematic diagram of an embodiment of the security architecture 300. The security architecture 300 of FIG. 3 is similar to the security architecture 100, 200 of FIGS. 1-2. As shown, the security architecture 300 includes groups of IoT devices 310, an access point 330, and a serving cellular network 340. The group of IoT devices 310, access point 330, and serving cellular network 340 of FIG. 3 are similar to the groups of IoT devices 110, 210, the access point 130, 230, and serving cellular network 140, 240, respectively, of FIGS. 1-2.

The IoT devices 311 in FIG. 3 are designated as "First IoT device," "Second IoT device," and "Third IoT device." In an embodiment, the IoT devices 311 are grouped based on similarities in their functionalities. In an embodiment, the IoT devices 311 are grouped together because they share a common operator and/or service provider.

In an embodiment, the first IoT device 311 belongs to a first group of IoT devices 310, the second IoT device 311 belongs to first and second groups of IoT devices 310, and the third IoT device 311 belongs to the second group of IoT devices. In other words, the second IoT device 311 belongs to more than one group of IoT devices 310.

In FIG. 3, the security architecture 300 includes a first access point 330 of the serving cellular network 340, and a second access point 330 of the serving cellular network 340. The first access point 330 and the second access point 330 of FIG. 3 are similar to the access points 130, 230 of FIGS. 1-2. The first group of IoT devices 310 has a group trust relationship 321, designated as "Group-1 security trust," with the first access point 330 of the serving cellular network 340. As such, the first group of IoT devices 310 employs the Group-1 security trust when communicating with the serving cellular network 340 via the first access point 330. The second group of IoT devices 310 has another group trust relationship 321, designated as "Group-2 security trust," with the second access point 330 of the serving cellular network 340. As such, the second group of IoT devices 310 employs the Group-2 security trust when communicating with the serving cellular network 340 via the second access point 330. Because the second IoT device 311 belongs to both the first and second groups of IoT devices, the second IoT device 311 is able to use either the first group trust relationship or the second group trust relationship to transmit data to the access point 330. The selection of the group trust relationship may depend on type of data being transmitted.

In an embodiment, each IoT device 311 has at least one private trust relationship and at least one group trust relationship 321. In an embodiment, each IoT device 311 is configured to store their respective group trust relationship details. For example, the first IoT device 311 is configured to store group trust relationship details, designated as "C-ST1." Because the second IoT device 311 belongs to two groups, the second IoT device 311 is configured to store group trust relationships details, designated as "C-ST1" and "C-ST2." The third IoT device 311 is configured to store group trust relationship details, designated as "C-ST2."

In an embodiment, the first access point 330 is configured to store the group trust relationship details, C-ST1, corresponding to the first group of IoT devices 310 because the first access point 330 serves as the access point of the serving cellular network 340 for the first group of IoT devices 310. Similarly, the second access point 330 is configured to store the group trust relationship details, C-ST2, corresponding to the second group of IoT devices 310.

In an embodiment, the serving cellular network 340 comprises an MME 350, an IoT application server 360, and an IoT gateway 370. The MME 350, the IoT application server 360, and the IoT gateway 370 of FIG. 3 are similar to the MME 150, 250, the IoT application server 160, 260, and the IoT gateway 170, 270 of FIGS. 1-2. The MME 350 of the serving cellular network 340 is configured to store the private trust relationship details, P-ST1, P-ST2, P-ST3, corresponding to each IoT device 311, and the group trust relationship details, C-ST1, C-ST2, corresponding to each group of IoT devices 210.

In an embodiment, data is sent from one of the IoT devices 311 to the access point 330 through the group trust relationship 321. The access point 330 transmits the data to the IoT gateway 370 in the serving cellular network 340. From there, the IoT gateway 370 handles the routing of the data to corresponding IoT application servers 360. In doing so, the IoT device 311 and the access point 330 save the group trust relationship details relative to the IoT device 311. The MME 350 stores the private trust relationship details and the group trust relationship details relative to the IoT device 311. The IoT device 311 can directly use the group trust relationship when the IoT device "wakes-up" and is ready to transmit data in next instance.

The IoT devices 111, 211, 311, may be fixed (e.g., not mobile) in the security architecture 100, 200, 300. Even though the location of a fixed IoT device does not change, the IoT device may leave a particular group of IoT devices to join another group of IoT devices. In an embodiment, the serving cellular network updates the group trust relationship when an IoT device leaves a group of IoT devices. The process of updating the group trust relationship of a specific group of IoT devices may be achieved in several ways. For an example, the serving cellular network may update the group trust relationship the first time an IoT device, which is still within the original group of IoT devices, attempts to transmit data to the serving cellular network. In another example, the serving cellular network employs a paging mechanism that alerts the IoT devices within a group of IoT devices that an update for the group trust relationship is needed. In yet another example, the serving cellular network may alert a leader IoT device and the rest of the IoT devices in the group of IoT devices about an update for the group trust relationship that is needed.

In an embodiment, a new IoT device may be allocated with a group trust relationship that a group of IoT devices shares with the access point of the serving cellular network when the new IoT device joins the group of IoT devices.

In an embodiment, the group trust relationship between a group of IoT devices and the access point of the serving cellular network may be described as per-group-per-access-point, where each access point of the serving cellular network maintains a list of the IoT groups that is being served and the respective group trust relationships that they are allocated. In such an embodiment, the access point of the serving cellular network has access to a node in the serving cellular network that can validate the group(s) of IoT devices of which an IoT device is a member. In other words, the access point has access to a database or server (e.g., the HSS of the serving cellular network) where the mapping of IoT devices to their respective group(s) of IoT devices is being maintained.

In an embodiment, the security architecture 100-300 provides that the access points 130-330 of the serving cellular network 140-340 are to associate the data of any IoT device 111-311 to its group trust relationships 121-321. In an embodiment, this association of the data to its group trust relationship is achieved by having a group trust relationship identifier and an IoT device identifier, or by the data comprising an index. The index is referenced via a local table or via an interface provided by a network node such as an HSS.

Figure 4:
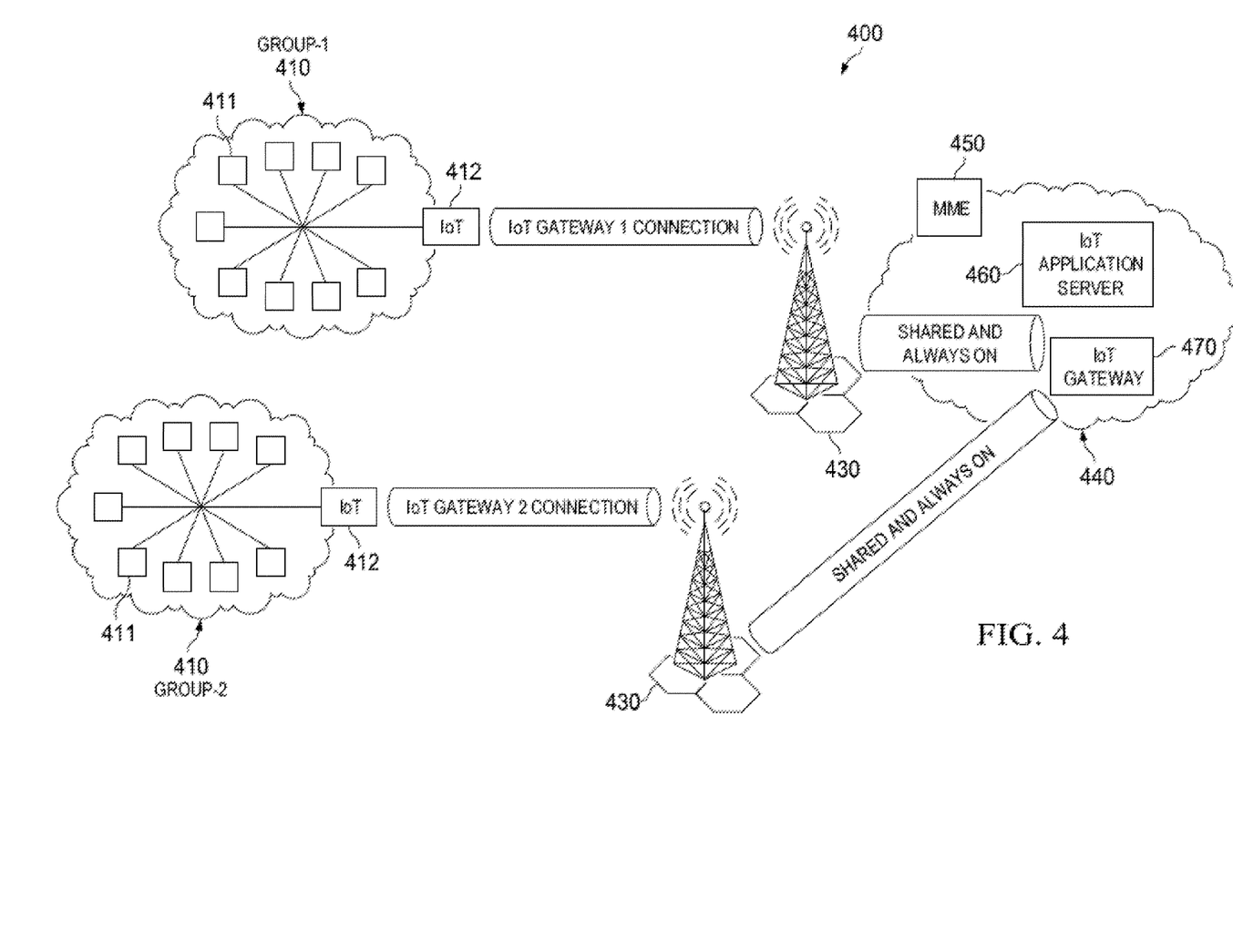
FIG. 4 is a schematic diagram of an IoT device accessing a serving cellular network according to an embodiment of the disclosure.

FIG. 4 is a schematic diagram of an embodiment of the security architecture 400. The security architecture 400 of FIG. 4 is similar to the security architecture 100, 200, 300 of FIGS. 1-3. As shown, the security architecture 400 includes groups of IoT devices 410 containing IoT devices 411, an access point 430, and a serving cellular network 440 including an MME 450, an IoT application server 460, and the IoT gateway 470. The group of IoT devices 410, IoT devices 411, access point 430, serving cellular network 440, MME 450, an IoT application server 460, and IoT gateway 470 of FIG. 4 are similar to the groups of IoT devices 110, 210, 310, IoT devices 411, access points 130, 230, 330, serving cellular networks 140, 240, 340, MME 150, 250, 350, the IoT application server 160, 260, 360, 460, and the IoT gateway 170, 270, 370, 470, respectively, of FIGS. 1-4. However, in FIG. 4 one of the IoT devices 411 serves as a local IoT gateway 412. As such, the IoT devices 411 do not directly access the access point 430 of the serving network 440. Rather, the IoT devices 411 access the serving network 440 through the local IoT gateway device 412.

In an embodiment, each IoT device 411 in FIG. 4 includes two private trust relationships. For example, a first private trust relationship is for communications with the local IoT gateway device 412 and a second private trust relationship is for communications with the IoT application server 460. Therefore, the local IoT gateway device 412 can uniquely identify the communicating IoT device 411 based on the first private trust relationship, and the IoT application server 460 can uniquely identify the communicating IoT device 411 based on the second private trust relationship.

Figure 5:
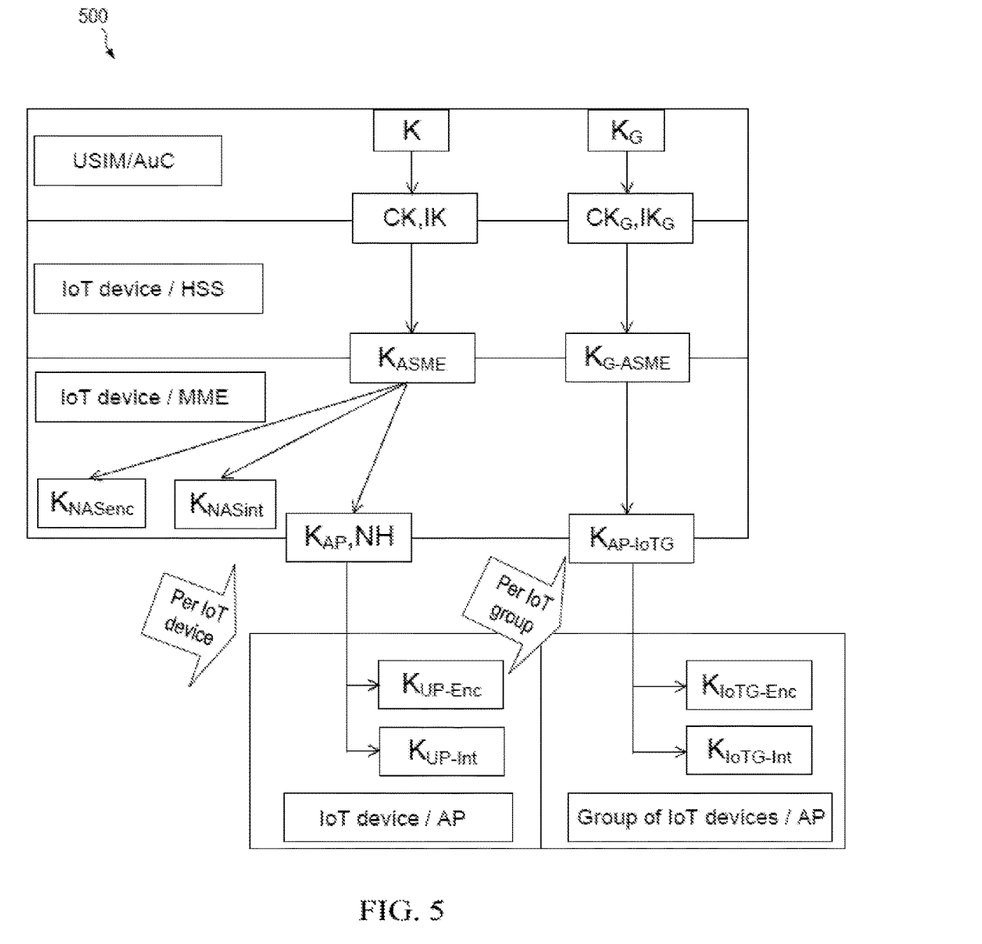
FIG. 5 is a protocol diagram illustrating the establishment of a per-IoT group trust relationship according to an embodiment of the disclosure.

FIG. 5 is a protocol diagram 500 illustrating an embodiment of the establishment of a per-IoT group trust relationship. The per-IoT group trust relationship may be utilized, for example, within the security architecture 100, 200 or 300. During the process, both a private trust relationship and the per-IoT group trust relationship are established.

Establishing the private trust relationship comprises generating a cyphering key (CK) and a first integrity protection key (IK) using a preconfigured key (K). The preconfigured key K is obtained from a Universal Subscriber Identity Module (USIM) of an IoT device (e.g., IoT device 111-411) and an authentication center (AuC) of the HSS of the serving cellular network (e.g., network 140-440).

On the IoT device side of the security architecture, the IoT device generates an access security mobility key ($K_{ASME}$) using the CK and IK. The IoT device then uses the $K_{ASME}$ key to generate non-access stratum encryption key ($K_{NASenc}$), non-access stratum integrity protection key ($K_{NASint}$), access point of the serving cellular network key ($K_{AP}$) and next hop key (NH). The IoT device then uses the $K_{AP}$ key to generate $K_{UP-Int}$ and $K_{UP-Enc}$ keys. The IoT device uses the $K_{UP-Int}$ and $K_{UP-Enc}$ keys to encrypt and integrity protect the data transmitted. On the network side of the security architecture, the AuC of the HSS generates the CK and IK keys using a preconfigured key (K). The HSS then generates the $K_{ASME}$ key using the CK and IK keys. The HSS provides the $K_{ASME}$ key to the MME. The MME generates the $K_{NASenc}$, the $K_{NASint}$, the $K_{AP}$ and the NH using the $K_{ASME}$ key. The MME then transmits the $K_{AP}$ to the access point of the serving cellular network. The access point of the serving cellular network uses the key $K_{AP}$ to generate the $K_{UP-Int}$ and the $K_{UP-Enc}$ keys. By performing these or similar steps, the private trust relationship is established between the IoT device and the access point of the serving cellular network. At this point, both the IoT device and the access point of the serving cellular network have the $K_{UP-Int}$ and the $K_{UP-Enc}$ keys. Therefore, data may be encrypted, integrity protected, and transmitted by the IoT device to the access point. Once the data is transmitted by the IoT device to the access point, the $K_{UP-Int}$ and the $K_{UP-Enc}$ keys are discarded and the IoT device goes idle.

The access point of the serving cellular network has the same keys corresponding to the IoT device. Therefore, the access point of the serving cellular network is able to parse and transmit the received data to corresponding IoT gateway, which routes the data to the appropriate IoT application server.

After the first IoT device has transmitted data to the access point of the serving cellular network for the first time, the per-IoT group trust relationship is established. To do so, the IoT device within a group of the IoT devices uses another preconfigured key ($K_G$) corresponding to the group of IoT devices, as opposed to a single IoT device, to generate a group cyphering key ($CK_G$) and group integrity protection key ($IK_G$). As shown, the AuC of the HHS of the serving cellular network also generates a group cyphering key ($CK_G$) and group integrity protection key ($IK_G$).

Next, the IoT device and the HSS of the serving cellular network use the keys $CK_G$ and $IK_G$ to generate a group access security mobility key ($K_{G-ASME}$). The HSS provides the $K_{G-ASME}$ to the MME. The IoT device and the MME then use the key $K_{G-ASME}$ to generate a group security key ($K_{AP-IoTG}$) corresponding to the access point of the serving cellular network and the IoT device. The MME provides the key $K_{AP-IoTG}$ to the access point of the serving cellular network. Thereafter, the IoT device and the access point of the serving cellular network generate a group encryption security key ($K_{IoTG-Enc}$) and a group integrity protection key ($K_{IoTG-Int}$) using the $K_{AP-IoTG}$. By performing these or similar steps, the group trust relationship is established between the group of IoT devices, which includes the IoT device, and the access point of the serving cellular network.

Unlike the $K_{UP-Int}$ and the $K_{UP-Enc}$ keys in the private trust relationship, the key $K_{IoTG-Enc}$ and the key $K_{IoTG-Int}$ are not discarded. Rather, these keys are stored or maintained. Because the security keys are maintained, an "always on" connection exists between the IoT devices in the group and the access point. Because the connection is "always on," each time an IoT device "wakes up" the IoT device is able to transmit without new security keys having to be established. As such, the load/overhead on the access point is reduced.

Figure 6:
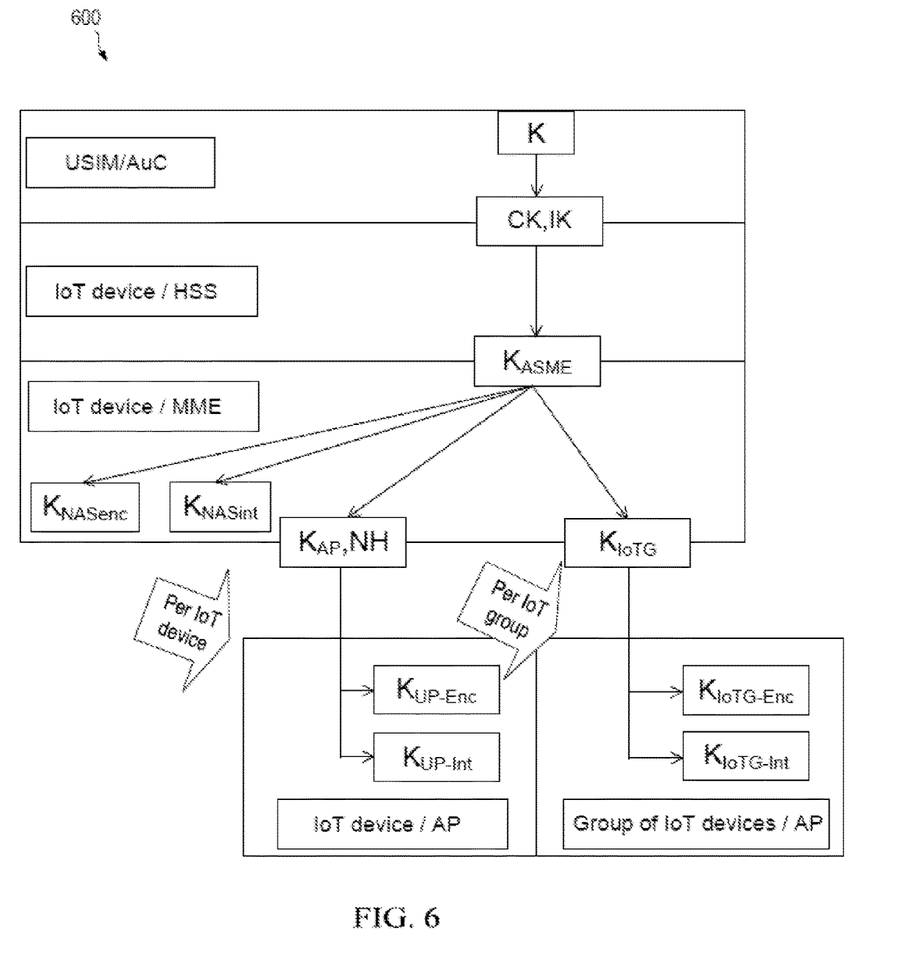
FIG. 6 is a protocol diagram illustrating the establishment of a per-IoT group trust relationship according to an embodiment of the disclosure.

FIG. 6 is a protocol diagram illustrating the establishment of a per-IoT group trust relationship in an embodiment. The per-IoT group trust relationship may be utilized, for example, within the security architecture 100, 200 or 300. The protocol diagram of FIG. 6 is similar to the protocol diagram of FIG. 5. For the sake of brevity, only those steps or elements that are different will be described in detail.

In the embodiment of FIG. 6, the IoT devices do not include a preconfigured key corresponding to a group of IoT devices (e.g., key $K_G$ in FIG. 5). Rather, an IoT device and the access point receive a group security key ($K_{IoTG}$) from a network device (e.g., the MME) over a per-device secure channel. In an embodiment, the MME is able to identify the group of IoT devices to which the IoT device should belong based on the private trust relationship. The MME then assigns the IoT device to the corresponding group of IoT devices.

Using the key $K_{IoTG}$ received from the network side of the security architecture, the IoT device and the access point generate a group encryption security key ($K_{IoTG-Enc}$) and a group integrity protection key ($K_{IoTG-Int}$). By performing these or similar steps, the group trust relationship is established between the group of IoT devices, which includes the IoT device, and the access point of the serving cellular network.

The key $K_{IoTG-Enc}$ and the key $K_{IoTG-Int}$ are not discarded. Rather, these keys are stored or maintained. Because the security keys are maintained, an "always on" connection exists between the IoT devices in the group and the access point. Because the connection is "always on," each time an IoT device "wakes up" the IoT device is able to transmit without new security keys having to be established. As such, the load/overhead on the access point is reduced.

Figure 7:
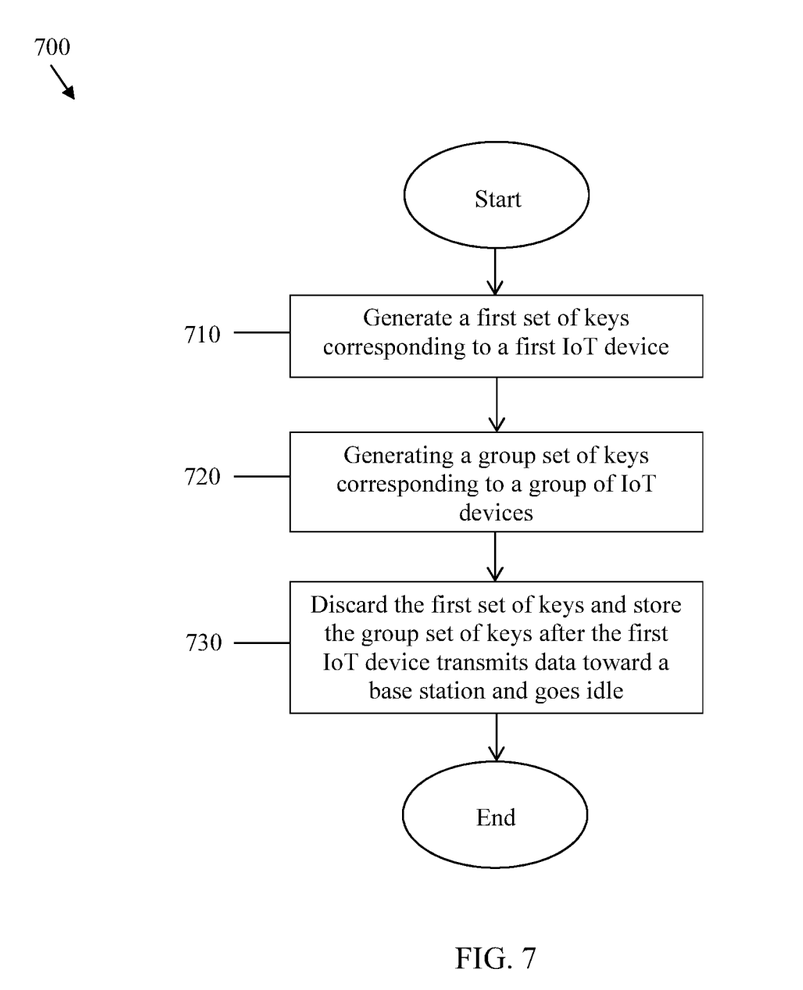
FIG. 7 is a flowchart of an embodiment of a method of establishing a group trust relationship in a security system of the security architecture of the disclosure.

FIG. 7 is a flowchart of an embodiment of a method 700 of establishing a group security trust relationship in an IoT system. The method 700 is implemented by an IoT device such as the IoT devices 111-311 and the local IoT gateway device 412. The method 700 is implemented, for example, when data is to be encrypted and transmitted over a network.

At step 710, a first set of keys corresponding to a first IoT device is generated. In an embodiment, the first set of keys comprises at least the $K_{UP-Int}$ and $K_{UP-Enc}$ keys. At step 720, a group set of keys corresponding to the group of IoT devices is generated. In an embodiment, the group set of keys comprises at least the $K_{IoTG-Enc}$ and the key $K_{IoTG-Int}$ keys. At step 730, the first set of keys is discarded and the group set of keys are stored after the IoT device transmits data towards a base station and then goes idle. In an embodiment, the group set of keys is used by each IoT device within the group of IoT devices for subsequent transmissions of data to the base station.

Figure 8:
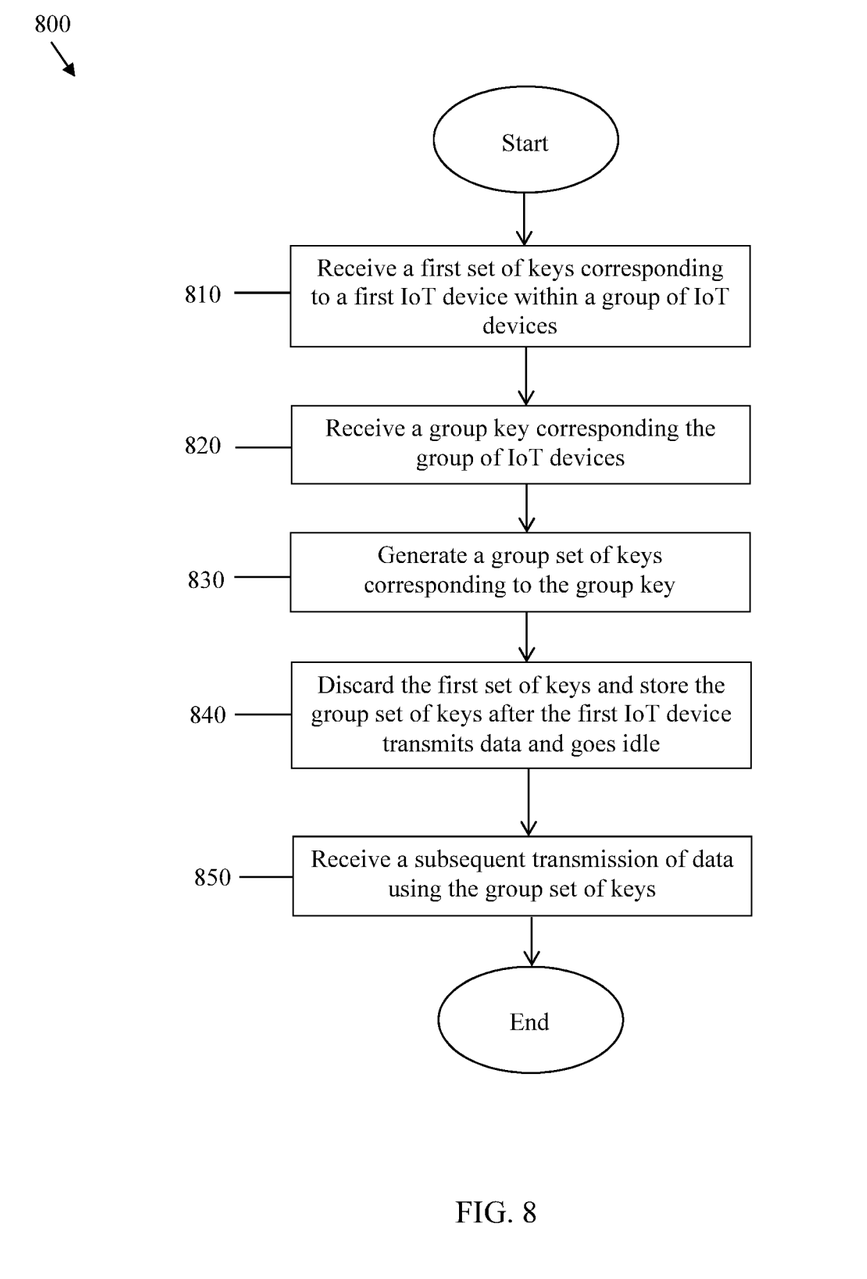
FIG. 8 is a flowchart of an embodiment of a method of establishing a group trust relationship according to another embodiment of the disclosure.

FIG. 8 is a flowchart of an embodiment of a method 800 of establishing a group trust relationship in an IoT system. The method 800 is implemented by an access point of a serving cellular network such as access points 130-430. The method 800 is implemented, for example, when data is to be encrypted and transmitted over a network.

At step 810, a first set of keys corresponding to a first IoT device within a group of IoT devices is received from a management entity. In an embodiment, the first set of keys comprises at least the $K_{UP-Int}$ and $K_{UP-Enc}$ keys. In an embodiment, the management entity is an MME such as MME 150-350. At step 820, a group key corresponding the group of IoT devices is received. In an embodiment, the group key comprises the preconfigured key ($K_G$). At step 830, a group set of keys corresponding the group key is generated. In an embodiment, the group set of keys comprises at least $K_{IoTG-Enc}$ and the key $K_{IoTG-Int}$ keys.

At step 840, the first set of keys is discarded and the group set of keys are stored after the IoT device transmits data and then goes idle. At step 850, a subsequent transmission of data using the group set of keys is received from a second IoT device within the group of IoT devices.

Figure 9:
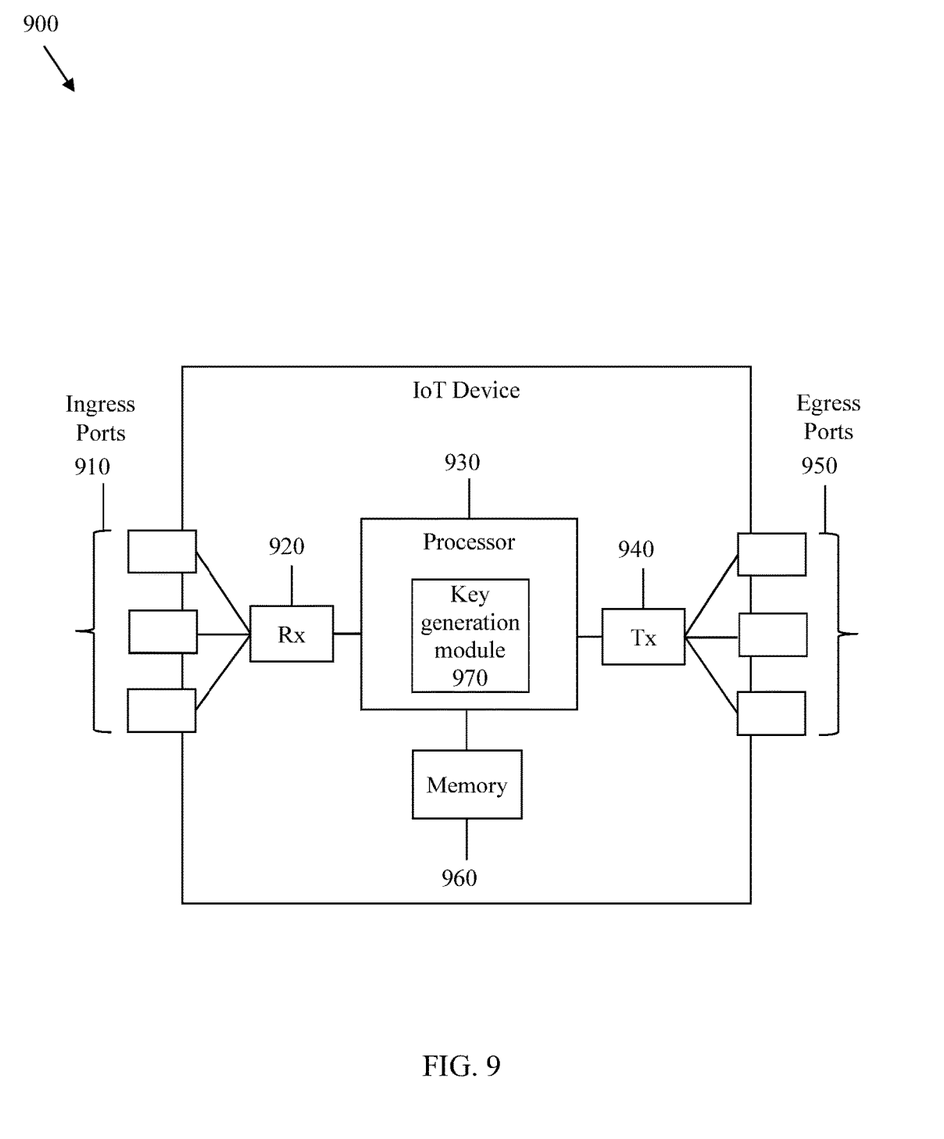
FIG. 9 is a schematic diagram of a device in an IoT system according to an embodiment of the disclosure.

FIG. 9 is a schematic diagram of an IoT device 900 in an IoT system according to an embodiment of the disclosure. The IoT device 900 is suitable for implementing the disclosed embodiments as described above. The IoT device 900 comprises one or more ingress ports 910 and a receiver unit (Rx) 920 for receiving data; at least one processor, logic unit, or central processing unit (CPU) 930 to process the data; a transmitter unit (Tx) 940 and one or more egress ports 950 for transmitting the data; and a memory 960 for storing the data.

The at least one processor 930 is implemented by hardware and software. The at least one processor 930 may be implemented as one or more CPU chips, cores (e.g., as a multi-core processor), field-programmable gate arrays (FPGAs), application specific integrated circuits (ASICs), or digital signal processors (DSPs). The at least one processor 930 is in communication with the one or more ingress ports 910, receiver unit 920, transmitter unit 940, one or more egress ports 950, and memory 960. The at least one processor 930 comprises a key generation module 970. The key generation module 970 implements the disclosed embodiments described above. For instance, the key generation module 970 implements an IoT device 111-311 and/or the local IoT gateway device 412. The inclusion of the key generation module 970 therefore provides a substantial improvement to the functionality of the IoT device 900 and effects a transformation of the IoT device 900 to a different state. Alternatively, the key generation module 970 is implemented as instructions stored in the memory 960 and executed by the at least one processor 930.

The memory 960 comprises one or more disks, tape drives, or solid-state drives and may be used as an over-flow data storage device, to store programs when such programs are selected for execution, or to store instructions and data that are read during program execution. The memory 960 may be volatile or non-volatile and may be read-only memory (ROM), random-access memory (RAM), ternary content-addressable memory (TCAM), or static random-access memory (SRAM).

Disclosed is a method of establishing a group trust relationship in an Internet of Things (IoT) system including means for generating a first set of keys corresponding to a first IoT device, means for deriving a group set of keys corresponding a group of IoT devices, and means for discarding the first set of keys and storing the group set of keys after the first IoT device transmits data toward a base station and goes idle, wherein the group set of keys is used by each IoT device within the group of IoT devices for subsequent transmissions of data to the base station.

Disclosed is a method of establishing a group trust relationship in an Internet of Things (IoT) system including means for receiving, from a management entity, a first set of keys corresponding to a first IoT device within a group of IoT devices, means for receiving, from a management entity, a group key corresponding the group of IoT devices, means for generating a group set of keys corresponding the group key, means for discarding the first set of keys and storing the group set of keys after the first IoT device transmits data and goes idle, and means for receiving, from a second IoT device within the IoT group, a subsequent transmission of data using the group set of keys.

Disclosed is a management entity configured to establish a group trust relationship in an Internet of Things (IoT) system including means for obtaining, from a subscriber identification module card, a secret key corresponding to a first IoT device from a group of IoT devices, means for deriving a cyphering key and an integrity protection key based on the secret key, means for deriving an access security mobility entity key based on the cyphering key and an integrity protection key, means for deriving a first set of keys corresponding to the first IoT device based on the access security mobility entity key, and means for encrypting and transmitting a group secret key to the first device over a secure communications channel, wherein the group secret key permits the first IoT device to generate a group set of keys for subsequent transmissions of data.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of establishing a group trust relationship in an Internet of Things (IoT) system using a first IoT device within a group of IoT devices, comprising:
   generating, by the first IoT device, a first set of keys corresponding to the first IoT device;
   transmitting, by the first IoT device, initial data toward a base station using the first set of keys;
   discarding, by the first IoT device, the first set of keys following transmission of the initial data toward the base station using the first set of keys;
   deriving, by the first IoT device, a group set of keys corresponding to the group of IoT devices after the first set of keys has been discarded; and
   storing, by each of the IoT devices, the group set of keys to establish an always on connection between each of the IoT devices and the base station, the always on connection maintained while each of the IoT devices is idle; and
   transmitting, by one of the IoT devices, subsequent data using the group set of keys and the always on connection upon waking up.

2. The method of claim 1, wherein the group set of keys includes at least one of a group base station key, a group encryption key, or a group integrity key corresponding to the group of IoT devices.

3. The method of claim 1, wherein the group set of keys is based on a group access security mobility entity key derived by the first IoT device.

4. The method of claim 3, wherein the group access security mobility entity key is based on a group cyphering key and a group integrity protection key derived by the first IoT device.

5. The method of claim 4, wherein the group cyphering key and the group integrity protection key are based on a group secret key obtained from the first IoT device.

6. The method of claim 5, wherein the group secret key used to generate the group set of keys is pre-configured on a card of the first IoT device.

7. The method of claim 5, wherein the group secret key used to generate the group set of keys is received by the first IoT device over a per-device secure channel.

8. The method of claim 1, wherein the first IoT device serves as an IoT gateway for each of the other IoT devices in the group of IoT devices.

9. A method of establishing a group trust relationship in an Internet of Things (IoT) system using a base controller, comprising:
   receiving, from a management entity, a first set of keys corresponding to a first IoT device within a group of IoT devices;
   receiving, from the management entity, a group key corresponding to the group of IoT devices after the first IoT device has transmitted initial data using the first set of keys;
   generating a group set of keys corresponding to the group key;

discarding the first set of keys and storing the group set of keys to establish an always on connection between each of the IoT devices and the base controller, the always on connection maintained while each of the IoT devices is idle; and receiving, from a second IoT device within the IoT group, subsequent data using the group set of keys and the always on connection.

10. The method of claim 9, wherein the group set of keys includes at least one of a group base station key, a group encryption key, or a group integrity key corresponding to the group of IoT devices.

11. The method of claim 9, wherein the group set of keys is based on a group access security mobility entity key derived by the management entity.

12. The method of claim 11, wherein the group access security mobility entity key is based on a group cyphering key and a group integrity protection key derived by the management entity, and wherein the group cyphering key and the group integrity protection key are based on a group secret key obtained from a subscriber identification module card of the management entity.

13. The method of claim 11, wherein the first IoT device and each other IoT device in the group of IoT devices share the group secret key.

14. The method of claim 13, wherein the first IoT device and each other IoT device in the group of IoT devices share the group cyphering key and the group integrity protection key.

15. The method of claim 9, further comprising sending, to at least one of the IoT devices in the group of IoT devices, a challenge requesting the at least of the IoT devices to reestablish the group trust relationship.

16. A management entity configured to establish a group trust relationship in an Internet of Things (IoT) system, comprising:
 a non-transitory memory storage comprising instructions; and
 one or more processors in communication with the memory, wherein the one or more processors execute the instructions to:
  obtain, from a subscriber identification module card, a secret key corresponding to a first IoT device from a group of IoT devices;
  derive a cyphering key and an integrity protection key based on the secret key;
  derive an access security mobility entity key based on the cyphering key and an integrity protection key;
  derive a first set of keys corresponding to the first IoT device based on the access security mobility entity key, the first set of keys configured to be used by the first IoT device to transmit initial data and then discarded; and
  encrypt and transmit a group secret key to the first IoT device over a secure communications channel, wherein the group secret key permits the first IoT device to generate a group set of keys, the group set of keys configured to be stored to establish an always on connection, the always on connection maintained while the first IoT device is idle and used by the first IoT device to transmit subsequent data.

17. The management entity of claim 16, wherein the group set of keys is utilized by all of the IoT devices in the group of IoT devices for subsequent transmissions of data.

18. The management entity of claim 16, wherein the group set of keys includes at least one of a group base station key, a group encryption key, or a group integrity key.

19. The management entity of claim 16, wherein the group secret key is encrypted and transmitted individually to each IoT device in the group of IoT devices.

20. The management entity of claim 16, wherein the management entity resides in a serving cellular network, and wherein the management entity is in communication with the IoT device by way of at least one base station.

* * * * *

UNITED STATES PATENT AND TRADEMARK OFFICE
CERTIFICATE OF CORRECTION

PATENT NO. : 10,219,152 B2
APPLICATION NO. : 15/263588
DATED : February 26, 2019
INVENTOR(S) : Ahmad Shawky Muhanna et al.

It is certified that error appears in the above-identified patent and that said Letters Patent is hereby corrected as shown below:

In the Claims

Column 15, Claim 15, Lines 30-33, should read:
15. The method of claim 9, further comprising sending, to at least one of the IoT devices in the group of IoT devices, a challenge requesting the at least one of the IoT devices to reestablish the group trust relationship.

Signed and Sealed this
Second Day of April, 2019

Andrei Iancu
*Director of the United States Patent and Trademark Office*